Dec. 24, 1940.                    T. PAUL                    2,226,441
              COMBINATION ELECTRICAL MEASURING INSTRUMENT
                  Filed Sept. 18, 1935          3 Sheets-Sheet 1
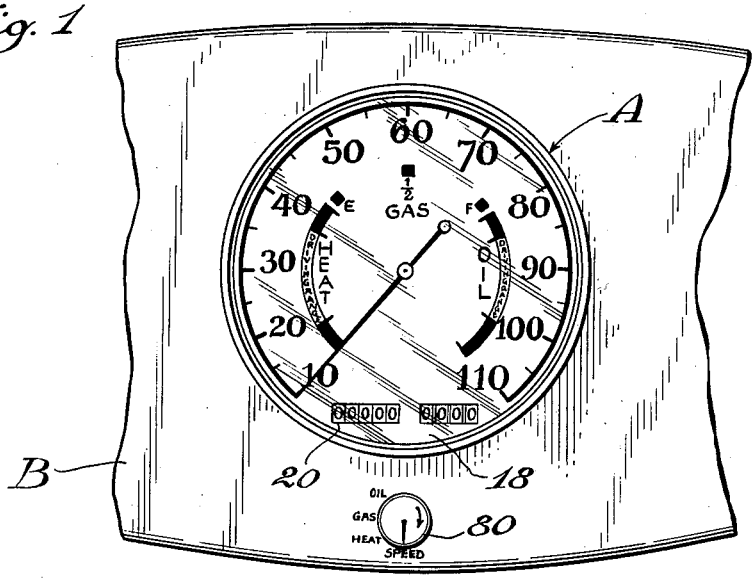
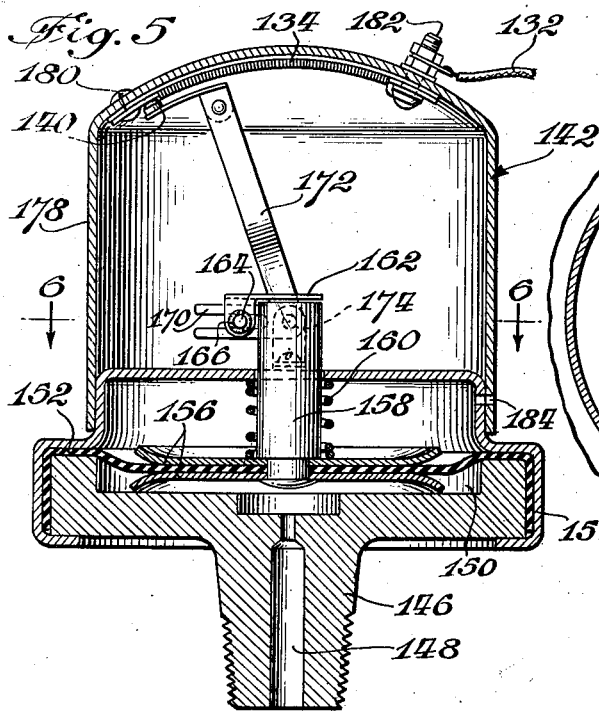
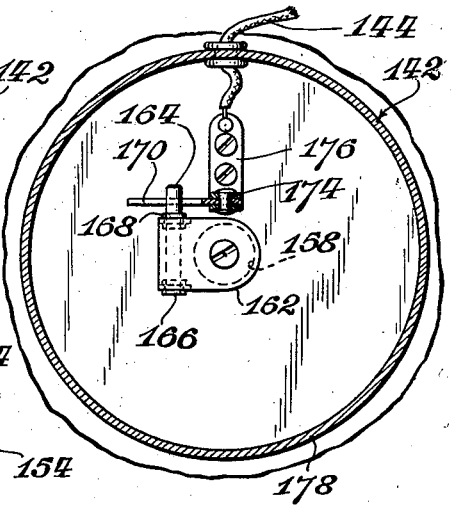
Inventor:
Thorolf Paul
By Williams, Bradbury, McCaleb & Hinkle
Attys.

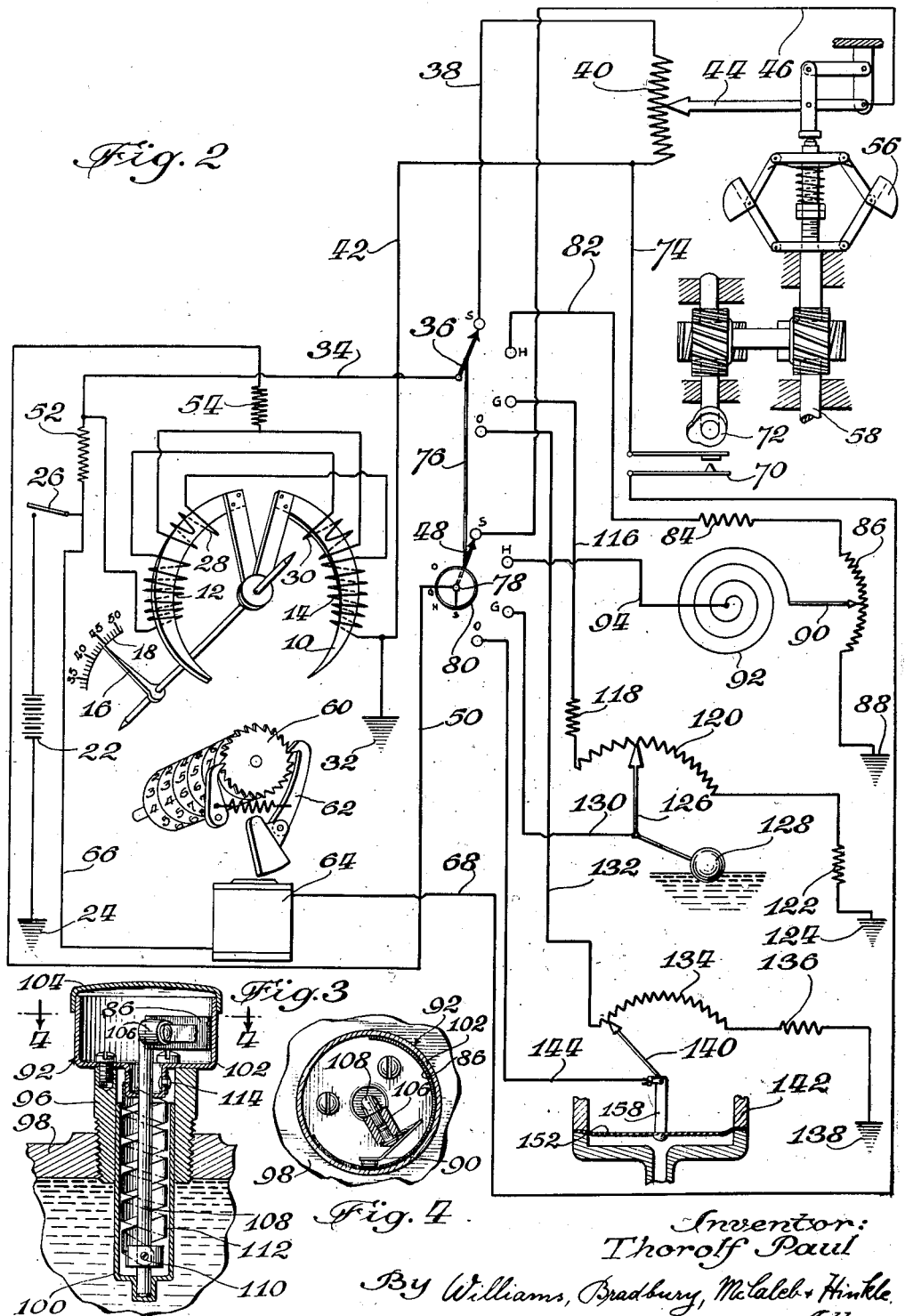

Dec. 24, 1940.        T. PAUL        2,226,441
COMBINATION ELECTRICAL MEASURING INSTRUMENT
Filed Sept. 18, 1935        3 Sheets-Sheet 3
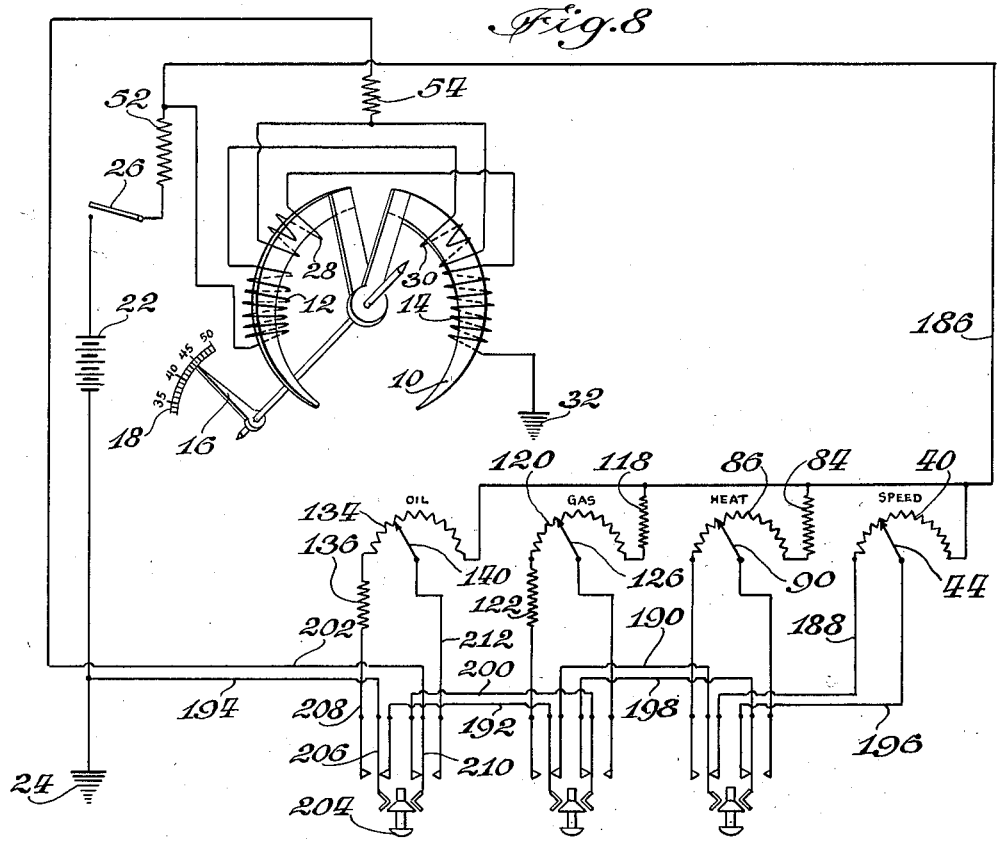
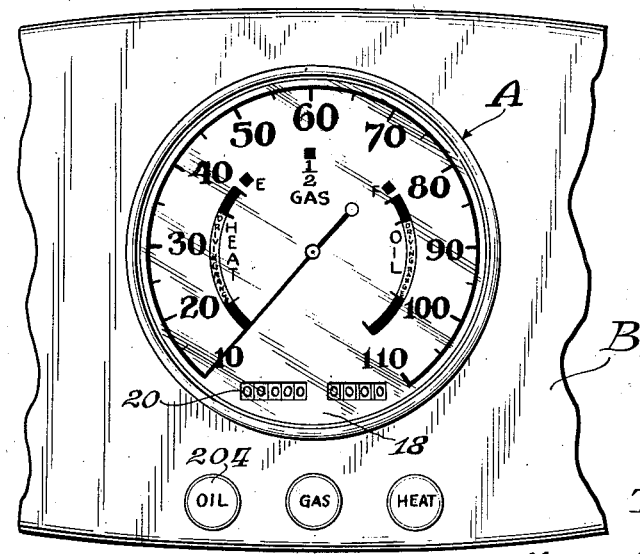
Inventor:
Thorolf Paul
By Williams, Bradbury, McCaleb & Hinkle.
Attys.

Patented Dec. 24, 1940

2,226,441

UNITED STATES PATENT OFFICE 2,226,441

COMBINATION ELECTRICAL MEASURING INSTRUMENT

Thorolf Paul, Chicago, Ill., assignor to Stewart-Warner Corporation, Chicago, Ill., a corporation of Virginia Application September 18, 1935, Serial No. 41,094

15 Claims. (Cl. 177—311)

My invention pertains to combination electrical measuring instruments and is particularly concerned with the provision of a measuring instrument for indicating the operating conditions of an automobile.

In present automotive practice it is customary to provide the instrument board of the automobile with a plurality of instruments, each indicating a separate operating characteristic. An object of my invention is to provide a single instrument which will indicate all of the essential operating conditions of the vehicle and which can be located at the most visible point on the instrument board.

Another object is to provide a single electrical measuring instrument for indicating the operating characteristics of an automobile which will be much more compact than the plurality of instruments now used for this purpose and which will provide a more attractive instrument board having more space available for other purposes.

Another object is to provide a single instrument which will be much cheaper to manufacture than the plurality of instruments which it supplants.

Another object is to provide a combined instrument having a novel arrangement of indicia for indicating the various characteristics of the automobile.

Another object is to provide a measuring instrument having a novel thermostatically-controlled rheostat.

Another object is to provide a measuring instrument having a novel pressure-controlled rheostat.

Other objects and advantages will become apparent as the description proceeds.

Referring to the drawings,

Figure 1 is a face view of the visible part of one embodiment of my invention;

Figure 2 is a diagrammatic representation of the several parts of one embodiment of my invention showing the electrical conduits connecting these several parts into the requisite electrical circuits;

Figure 3 is a longitudinal section through a temperature responsive rheostat used in indicating the engine temperature;

Figure 4 is a transverse section taken on the line 4—4 of Figure 3;

Figure 5 is a longitudinal section through a pressure responsive rheostat used in indicating the engine oil pressure;

Figure 6 is a transverse section taken on the line 6—6 of Figure 5;

Figure 7 is a view similar to Figure 1 but showing a modification of my invention; and Figure 8 is a diagrammatic representation of this modification.

Referring to Figures 1 and 2 of the drawings,

I have shown an indicator A adapted to be mounted on the instrument board B of an automobile or other automotive vehicle. The indicator may have the structure disclosed in application, Serial No. 754,522, filed November 23, 1934, and comprises in general a pivoted armature 10 which is moved in opposite directions by a pair of electromagnets 12 and 14. The armature 10 controls the position of a pointer 16 which is visible to the driver of the automobile and which moves over a dial plate 18. The dial plate in the particular instance shown in the drawings has a series of large numbers for indicating the vehicle speed, these large numbers being arranged adjacent the periphery of the dial. Inside of these speed indicating numbers are three other indicating means, one for indicating the engine temperature, another for indicating the quantity of gasoline in the gasoline tank of the vehicle, and the third for indicating the engine oil pressure. The usual mileage indicator 20 is also provided.

The electromagnets 12 and 14 are located in an electrical circuit comprising the usual automobile battery 22 which is grounded at 24, the ignition switch 26, heating coils 28 and 30, and a second ground 32. In parallel with the part of the circuit containing the electromagnets 12 and 14 and the heating coils 28 and 30 is a second circuit shown as including wire 34, switch 36, wire 38, resistance 40, and wire 42, leading to the ground 32.

The armature 10 and pointer 16 assume a position corresponding to the relative values of the currents passing through the electromagnets 12 and 14. These currents are varied by moving a slider 44 over the resistance 40, the slider 44 being electrically connected to a wire 46 leading to a second switch 48 leading to a conduit 50 which connects with the circuit containing the electromagnets 12 and 14 at a point electrically intermediate these magnets. I preferably provide the electrical circuits with ballast resistances 52 and 54 to assure accurate readings under all conditions of operation.

In Figures 1 and 2 of the drawings, the indicator A is connected up to operate as a speedometer, and the slider 44 is shown as being controlled by centrifugal weights 56 driven from a shaft 58 which is rotated by the propeller shaft of the vehicle or by any other rotating part which always rotates in unison with the rear wheels of the vehicle. The particular design of the centrifugal weights 56 and attendant mechanism may be that disclosed in said application, Serial No. 754,522, filed November 23, 1934.

The mileage indicating means comprises the numbers mounted on a rotatable drum attached to a ratchet wheel 60 rotated by a pawl 62 operated by an electromagnet 64. The circuit of the electromagnet includes wire 66 leading to ignition switch 26 and battery 22, and a second wire 68 connected to a contact switch 70 which is closed at intervals by a cam 72 driven through reduction gearing from the shaft 58, so that the cam 72 closes the contact switch 70 for each given increment of distance traveled by the vehicle, whereupon the indicia carrying drum is rotated through the angle represented by one tooth on the ratchet wheel 60. The other side of the contact switch 70 is grounded through wires 74 and 42. The particular structure of the various parts of the mileage indicator may be of the type shown in said application, Serial No. 754,522, filed November 23, 1934.

The movable elements of switches 36 and 48 are shown as connected by a link 76 whereby these two movable elements always pivot in unison. In the embodiment of Figures 1 and 2, the movable element of switch 48 is shown as mounted on a shaft 78 carrying a control button 80 which is shown as being located on the instrument board just beneath the indicator A. Around the button 80 the words "Speed," "Heat," "Gas," and "Oil," appear on the instrument board and this button 80 has a mark which is made to register with any one of these words, whereby the instrument is connected up to indicate the desired characteristic.

In the drawings the button 80 is shown as having its mark registering with the word "Speed" appearing on the instrument board, and the movable contacts of switches 36 and 48 are shown as engaging stationary contacts marked "S" which are connected in the electrical circuits controlled by the speed actuated slider 44. When the operator desires to know the engine temperature, he turns the button 80 until the mark thereon registers with the word "Heat" appearing on the instrument board. The movable contacts of switches 36 and 48 are then shifted to engage the stationary contacts marked "H." The stationary contact "H" of switch 36 is connected in a circuit including wire 82 and resistances 84 and 86. This circuit is grounded as indicated at 88. A slider 90 moves over the resistance 86 and is controlled by a thermostatic element 92 which varies with the temperature of the water in the water jacket of the engine. The slider 90 is electrically connected with the stationary contact H of switch 48 by a wire 94.

The thermostatic element 92 is best shown in Figures 3 and 4 of the drawings. This element comprises a fitting 96 threaded for attachment to the engine casting 98 so that a shell 100 carried by the fitting 96 projects into the engine water jacket. The other end of the fitting 96 carries a cup 102 to which the resistance 86 is attached. A suitable cover 104 protects the parts from dirt, water and oil.

The slider 90 is mounted in an insulating sleeve 106 carried by the bent-over end of a rod 108 which is journalled in a depression formed in the cup 102 and in a similar depression formed in the end of the shell 100. The rod 108 is connected at 110 to one end of a thermostatic strip 112 which is spirally arranged in the shell 100 and which has its other end secured to the cup 102 at 114, whereby variations of water temperature cause the thermostatic strip 112 to oscillate the rod 108 and thereby move the slider 90 along the resistance 86. In practice, one end of this resistance 86 is grounded by connecting it directly to the cup 102, the rest of the resistance being insulated from this cup by a suitable insulating strip interposed therebetween.

It will be noted that the speed scale of the indicator covers the entire range of movement of the pointer 16, whereas the scale for indicating the engine temperature occupies only about one-third of the entire range of movement of this pointer. This is an important feature of my invention and I obtain the desired result by making the resistance 40 three times as great as the resistance 86, the difference between the resistances 40 and 86 being compensated for by the resistance 84 so that the total resistance in each circuit is the same. For example, if the resistance 40 is given a value of 15 ohms, the resistance 86 is given a value of 5 ohms and the resistance 84 a value of 10 ohms.

With the arrangement of the resistances 84 and 86 in the engine temperature indicating circuit, the electromagnet 12 always receives more current than the electromagnet 14, whereby the pointer 16 always operates within the range of movement covered by the heat indicating indicia on the dial of the instrument.

When the driver of the vehicle desires to know the amount of gasoline in the gasoline tank, he turns the button 80 until the mark thereon registers with the word "Gas," whereupon the movable contacts of switches 36 and 38 are moved to engage the stationary contacts marked "G." The movable contact of the switch 36 is then in series with wire 116 and resistances 118, 120 and 122. The circuit formed through the resistances 118, 120 and 122 is grounded at 124 and is now in parallel with the circuit through the electromagnets 12 and 14.

A slider 126 moves over the resistance 120 under the control of a float 128 located in the gasoline tank. Various float-controlled rheostats have heretofore been used to indicate the fuel level in the tank of an automobile, and any preferred form of float-controlled rheostat may be used. The slider 126 is connected to a wire 130 leading to the stationary contact G of the switch 48.

In the example selected by way of illustration, each of the resistances 118, 120 and 122 is given a value of 5 ohms. The slider 126 travels over the central resistance only, whereby the pointer 16 moves over the central third of its complete range of movement in indicating the quantity of gasoline in the main tank of the automobile.

When the driver desires to know the pressure existing in the engine oiling system, he turns the button 80 until the mark thereon registers with the word "Oil" thereby shifting the movable contacts of switches 36 and 48 until they engage the stationary contacts marked "O." The movable contact of switch 36 connects through wire 132 with resistances 134 and 136 and ground 138 whereupon resistances 134 and 136 are placed in parallel with the circuit through the electromagnets 12 and 14. A slider 140 moves over resistance 134 under the control of an oil pressure responsive device 142. The slider 140 is electrically connected through wire 144 with the stationary contact O of switch 48. In the example selected, the resistance 134 is given a value of 5 ohms and the resistance 136 a value of 10 ohms, whereby the pointer 16 operates over the last third of its total range in indicating the engine oil pressure.

The oil pressure responsive device 142 is shown in detail in Figures 5 and 6. This device comprises a base 146 which is threaded for attachment to a part communicating with the outlet side of the usual engine oil pump. The base 146 has a passage 148 leading to a chamber 150 which is closed on one side by a flexible diaphragm 152 clamped between the base 146 and a sheet metal cup 154.

The central portion of the diaphragm 152 is clamped between opposed plates 156 secured to a slidable post 158 guided in a hole centrally located in the cup 154. A spring 160 urges the diaphragm 152 inwardly against the pressure of the oil. The upper end of the post 158 carries a bracket 162 holding a pin 164 which is insulated from the bracket 162 by collars 166 and 168 of rubber, fibre or other suitable insulating material.

The pin 164 slides in the bifurcated arm 170 of a lever 172 pivoted at 174 on a plate 176 which is attached to but insulated from the bottom of the cup 154. The plate 176 is connected to the wire 144, as indicated in Figure 6 of the drawings.

The upper end of the lever 172 carries the slider 140 which engages the resistance 134 carried in the upper part of a second sheet metal cup 178. The end 180 of the resistance 134 is grounded to the cup 178, the remainder of the resistance 134 being insulated therefrom. The other end of the resistance 134 is connected to the wire 132 by means of a binding post 182. The cups 178 and 154 are provided with registered openings providing a vent 184 for the space on the upper side of the diaphragm 152.

In the modification shown in Figures 7 and 8, a series of three push buttons is substituted for the rotatable button 80 of the previous embodiment. In the modified arrangement of Figures 7 and 8, the indicator A is identical with that previously described, and the means for controlling the sliders of the several circuits are also identical. In these figures the resistance 40 and slider 44 of the speed indicating part of the mechanism are normally connected in the circuit so that when the ignition switch 26 is closed the indicator A registers the speed of the vehicle.

One end of the resistance 40 is connected to a wire 186 leading to ballast resistance 42 and ignition switch 26. The other end of the resistance 40 is shown as connected to the ground 24 through wires 188, 190, 192 and 194. The slider 44 is connected to the ballast resistance 54 and the circuit containing the magnet coils 12 and 14 at a point intermediate these coils by way of wires 196, 198, 200 and 202.

The push buttons mounted on the instrument board just below the indicator A are resiliently held in their outer positions. When the push button 204, marked "Oil," is pressed inwardly, the downwardly directed end 206 of wire 194 is moved out of contact with the end of wire 192 and into contact with the end of wire 208 leading to resistances 134 and 136 which are also connected to the wire 186. This movement of the push button therefore disconnects the resistance 40 from ground 24 and places resistances 134 and 136 in parallel with magnet coils 12 and 14. The same inward movement of push button 204 moves the flexible end 210 of wire 202 out of contact with the end of wire 200 and into contact with the end of a wire 212 leading to the slider 140. This disconnects the speed slider 44 from ballast resistance 54 and connects the slider 140 into series with this ballast resistance 54 and the point on the circuit containing the magnet coils 12 and 14 which is intermediate these coils.

In other words, inward movement of the "Oil" button 204 disconnects the speedometer resistance 40 and its slider 44 and connects in lieu thereof the oil pressure resistances 134 and 136 and slider 140, whereupon the pointer of the indicator A indicates the oil pressure existing at the time the oil button is pressed. When the oil button 204 is released, it springs back to extended position, whereupon the ends 206 and 210 of wires 194 and 202, respectively, spring back to their original positions and reengage the ends of wires 192 and 200, respectively. This disconnects resistances 134 and 136 and slider 140 from the active part of the circuit and reconnects the speedometer resistance 40 and slider 144 into the active part of the circuit whereupon the indicator A again indicates the vehicle speed.

In a similar manner, when the vehicle operator presses the "Gas" button inwardly, the resistance 40 and slider 44 of the speedometer part of the circuit are momentarily disconnected and the resistances 118, 120, and 122 and slider 126, controlled by the float 128, are rendered effective to regulate the position of the indicator pointer 16. As soon as the push button, marked "Gas," is released, the resistances 118, 120 and 122 and the slider 126 become ineffectual to control the indicator A, and the speed controlled rheostats formed by the resistance 40 and slider 44 are again made effective to control the indicator A.

Likewise, when the push button marked "Heat" is pressed inwardly, the resistances 84 and 86 and the slider 90 controlled by the thermostat 92 are connected with the indicator A to control the position of its pointer 16. As soon as the button marked "Heat" is released, it returns to outward position, whereupon the resistances 84 and 86 and slider 90 are rendered ineffectual to control the indicator A, and the speed control resistance 40 and its slider 44 are again placed in electrical communication with the indicator A.

While I have shown my invention as being utilized to indicate the speed, engine temperature, gasoline supply and oil pressure of an automotive vehicle, it is to be understood that my invention is not limited to mechanism for indicating these characteristics only but that my invention may be utilized to indicate any one or more of these characteristics or may be utilized to indicate these four characteristics and other characteristics such as the quantity of oil in the engine crank-case, the quantity of water in the automobile battery, and other items, as desired. It is further to be understood that my invention is not limited to the particular details shown in the drawings and described in the specification, but that my invention may assume numerous forms, and that the scope of my invention is to be limited solely by the following claims.

I claim:

1. In an electrical instrument of the class described, the combination of an indicator having a pointer and dial capable of relative movement through a given range, said dial being provided with gasoline quantity, oil pressure, and engine temperature indicia arranged end to end substantially over said given range, means including an electrically-operated device of the type the energization of which is adapted to be varied for effecting relative movement between said pointer and dial, an electric circuit corresponding to each indicia, and an energization varying a device in each circuit adapted so to vary the energization of said electrically-operated device that relative movement between the pointer and dial is effected over a range equal to the corresponding indicia, and switch means for connecting said electrically-operated device with any one of said circuits.

2. In an electrical instrument of the class described, the combination of an indicator having a pointer and dial capable of relative movement through a given range, said dial being provided with speed indicia extending substantially throughout said given range, and other characteristic indicia having a range less than and having both its limits spaced from the limits of said given range, means including an electrically-operated device of the type the energization of which is adapted to be varied for effecting relative movement between said pointer and dial, an electric circuit corresponding to each indicia, and an energization varying a device in each circuit adapted so to vary the energization of said electrically-operated device that relative movement between the pointer and dial is effected over a range equal to the corresponding indicia, and switch means for connecting said electrically-operated device with any one of said circuits.

3. In an electrical instrument of the class described, the combination of an indicator having a pointer and dial capable of relative movement through a given range, said dial being provided with speed indicia extending substantially throughout said given range, and gasoline quantity, oil pressure, and engine temperature indicia arranged end to end substantially over said given range, an armature for causing relative movement between said dial and pointer, opposed electromagnets for moving said armature in opposite directions, an electric circuit corresponding to each indicia, adapted to be connected to the said electromagnets for varying the energization thereof and thereby effecting movement of the armature, each of said circuits including an energization-varying device adapted so to vary the energization of said electromagnets that the armature effects relative movement between said pointer and dial over a range corresponding to the corresponding indicia, a plurality of switch means normally maintaining said electromagnets in electrical communication with the circuit corresponding to said speed indicia, and operable to displaced positions to disconnect said electromagnets from said last-mentioned circuit and connect said electromagnets with predetermined ones of the other circuits and manually operable means for operating said switches from their normal to their displaced positions.

4. In an electrical instrument of the class described, the combination of an indicator having a pointer and a dial capable of relative movement throughout a given range, said dial having different indicia thereon corresponding to different ranges of movement, electrically operated means of the type the energization of which is adapted to be varied for effecting relative movement between said pointer and dial, a plurality of electrical circuits, each adapted to be connected with said electrically operated means, resistance means in each circuit adapted to be varied in conformity with a characteristic to be measured for varying the energization of said electrically-operated means, each resistance means providing a range of relative movement between the pointer and dial having limits different from the others, and switch means for connecting said circuits, one at a time, with said electrically operated means.

5. In an electrical instrument of the class described, the combination of an indicator including a pointer and dial relatively movable through a given range, said dial having indicia thereon extending throughout said given range and other indicia thereon extending through a portion of said range having a minimum limit different from the minimum limit of said given range, electrically operated means of the type the energization of which is adapted to be varied for effecting relative movement between said pointer and dial, a first circuit, energization-varying means in said first circuit variable to move said pointer throughout its full range, a second circuit, energization-varying means in said second circuit to move said pointer throughout that portion of its range corresponding to said last-mentioned indicia, and switch means for connecting said circuits with said electrically operated means.

6. In an electrical instrument of the class described, the combination of movable indicator means, electromagnetic means of the type the energization of which is adapted to be varied for moving said movable means, a first circuit having a given resistance, a second circuit having a slider movable over substantially all of said resistance, said first and second circuits constituting a potentiometer device for varying the energization of said electromagnetic means, a third circuit having substantially the same resistance as said first circuit, a fourth circuit having a slider movable over only part of the resistance of said third circuit, said third and fourth circuits constituting a potentiometer device for varying the energization of said electromagnetic means, means for moving said sliders, switch means normally connecting said first and second circuits with said electromagnetic means, and operable to disconnect said first and second circuits and to connect the third and fourth circuits to said electromagnetic means.

7. In an electrical instrument of the class described, the combination of movable indicator means, electrically-operated means of the type the energization of which is adapted to be varied for moving said movable means, a first circuit comprising a pair of branch circuits, one of the latter having a given resistance and the other having a slider movable over said entire resistance, said circuit constituting a potentiometer device for varying the energization of said electrically-operated means, a plurality of other circuits, each of said other circuits including a branch circuit having substantially the same resistance as said given resistance, and a cooperating branch circuit including a slider movable over a portion only of the resistance of its cooperating branch circuit, each slider of said other circuits being movable over a different portion of its cooperating resistance, means for moving said sliders, and switch means for selectively connecting said circuits with said electrically-operated means.

8. An electrical instrument of the class described, comprising an armature, electromagnetic means of the type the energization of which is adapted to be varied for moving said armature, indicating means movable with said armature, a plurality of circuits, each containing the same total resistance, a separate means co-operating with different portions of the resistance of each of said circuits and forming therewith a plurality of potentiometer devices adapted to vary the energization of said electromagnetic means in different limited ranges, and means for selectively connecting said circuits with said electromagnetic means.

9. In an instrument of the class described, the combination of an indicator including movable means, electrically-operated means of the type the energization of which is adapted to be varied for moving said movable means, a first circuit including a slider resistance, a second circuit including a slider cooperating with said resistance, a third circuit including a fixed resistance and a slider resistance, said circuits constituting a potentiometer device for varying the energization of said electrically-operated means, a fourth circuit including a slider cooperating with said last-mentioned slider resistance, said third and fourth circuits constituted a potentiometer device for varying the energization of said electrically-operated means, means for moving said sliders, and switch means for connecting either said first and second or said third and fourth circuits with said electrically-operated means.

10. In an electrical instrument of the class described, the combination of an indicator including movable means, electrically-operated means of the type the energization of which is adapted to be varied for moving said movable means, a circuit including a slider resistance and a fixed resistance ahead of said slider resistance, a second circuit including a slider resistance and a fixed resistance behind said slider resistance, a slider cooperating with each slider resistance and constituting therewith potentiometer devices for varying the energization of said electrically-operated means, means for operating said sliders, and switch means for connecting said circuits and sliders with said electrically-operated means.

11. In an electrical instrument of the class described, the combination of an indicator including movable means, electrically-operated means of the type the energization of which is adapted to be varied for moving said movable means, a circuit including a slider resistance and a fixed resistance on one side only of said slider resistance, a second circuit including a slider resistance and a fixed resistance on each side of said slider resistance, sliders cooperating with said slider resistances and constituting therewith potentiometer devices for varying the energization of said electrically-operated means, means for moving said sliders, and switch means for selectively connecting either slider resistance and its slider with said electrically-operated means.

12. In an electrical instrument of the class described, the combination of an indicator including movable means, electrically-operated means of the type the energization of which is adapted to be varied for moving said movable means, a circuit including a slider resistance and a fixed resistance ahead of said slider resistance, a second circuit including a slider resistance and a fixed resistance behind said slider resistance, a third circuit including a slider resistance and a fixed resistance on each side of said slider resistance, a slider cooperating with each slider resistance and constituting therewith potentiometer devices for varying the energization of said electrically-operated means, means for moving said sliders, and switch means for connecting said circuits and sliders to said electrically-operated means.

13. In an electrical instrument of the class described, the combination of an indicator including a movable element, electrically-operated means of the type the energization of which is adapted to be varied for moving said element, a circuit including a slider resistance, a second circuit including a slider resistance and a fixed resistance ahead of said slider resistance, a third circuit including a slider resistance and a fixed resistance on each side of said slider resistance, a fourth circuit including a slider resistance and a fixed resistance behind said slider resistance, a slider cooperating with each slider resistance and constituting therewith potentiometer devices for varying the energization of said electrically-operated means, means for moving said sliders, and switch means for connecting said circuits and sliders with said electrically-operated means.

14. In an electrical instrument of the class described, the combination of an indicator having a pointer and dial capable of relative movement throughout a given range, said dial being provided with speed indicia having a length corresponding to said range, and gasoline quantity, oil pressure and engine temperature indicia arranged end to end and having a joint length corresponding to said range, an armature for causing relative movement between said pointer and dial, opposed electromagnets for moving said armature in opposite directions, an electric circuit corresponding to each indicia adapted to be connected to the said electromagnets for varying the energization thereof and thereby effecting movement of the armature, each of said circuits including an energization-varying device adapted to vary the energization of said electromagnets that the armature effects relative movement between said pointer and dial over a range equal to the corresponding indicia, and switch means for connecting said electromagnets with one of said circuits.

15. In an electrical instrument of the class described, the combination of an indicator having a pointer, a dial, said dial and pointer being relatively movable through a given range, said dial having different indicia thereon corresponding to different ranges of relative movement between said pointer and dial, electrically-operated means of the type the energization of which is adapted to be varied for creating relative movement between said pointer and dial, a plurality of electrical circuits, each adapted to be connected with said electrically operated means, resistance means in each circuit adapted to be varied in conformity with a characteristic to be measured for varying the energization of said electrically-operated means, each of said resistance means having in circuit therewith other resistance means for additionally varying the energization of said electrically-operated means, thereby providing a different relative range of movement between said pointer and said dial, and switch means for connecting said circuits one at a time with said electrically-operated means.

THOROLF PAUL.

CERTIFICATE OF CORRECTION.

Patent No. 2,226,441.   December 24, 1940.

THOROLF PAUL.

It is hereby certified that error appears in the printed specification of the above numbered patent requiring correction as follows: Page 5, first column, lines 12, 13 and 14, claim 9, strike out the words and comma "said circuits constituting a potentiometer device for varying the energization of said electrically-operated means," and insert the same after the syllable and comma "sistance," in line 11, same claim; and that the said Letters Patent should be read with this correction therein that the same may conform to the record of the case in the Patent Office.

Signed and sealed this 11th day of February, A. D. 1941.

(Seal)

Henry Van Arsdale,
Acting Commissioner of Patents.